Jan. 2, 1940.   J. D. CUNNINGHAM   2,185,294
CHART MOUNTING FOR INSTRUMENTS
Filed Nov. 5, 1936
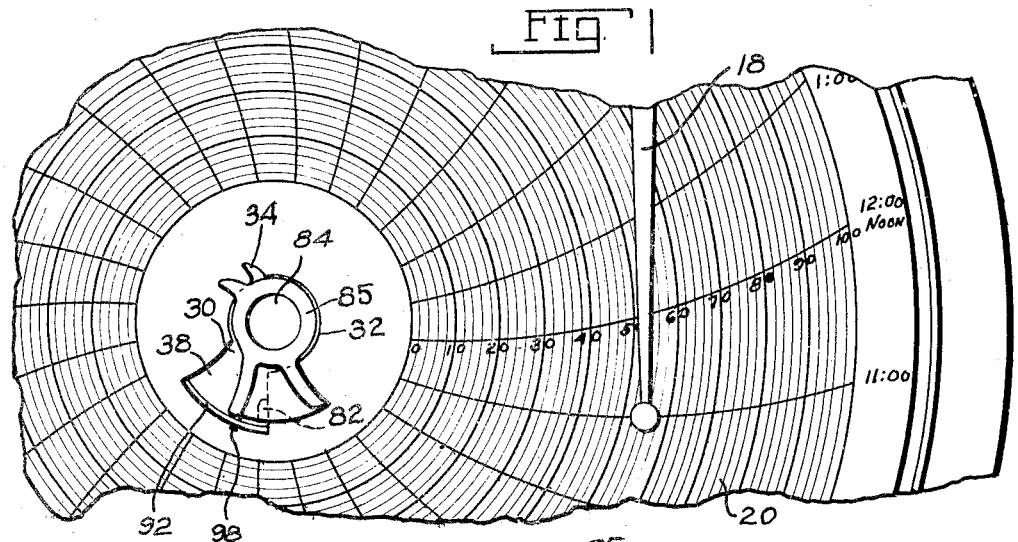
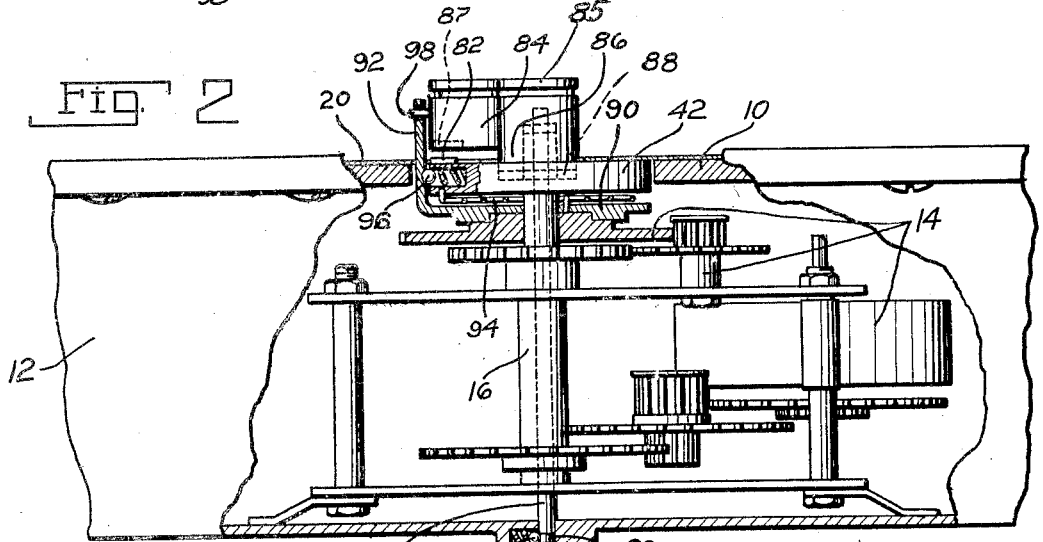
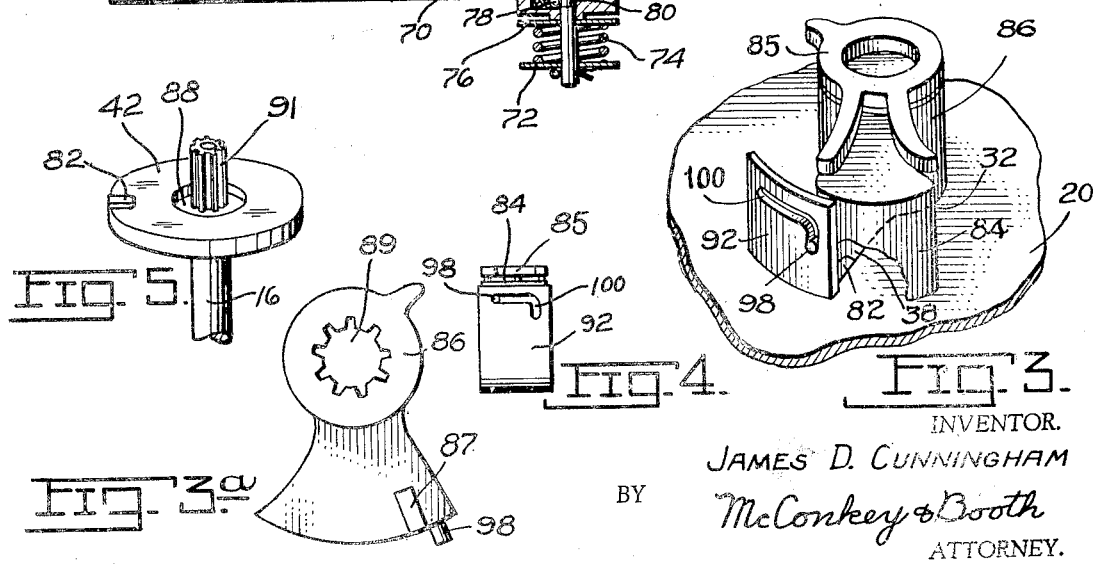
INVENTOR.
JAMES D. CUNNINGHAM
BY McConkey & Booth
ATTORNEY.

Patented Jan. 2, 1940

2,185,294

UNITED STATES PATENT OFFICE 2,185,294

CHART MOUNTING FOR INSTRUMENTS

James D. Cunningham, Chicago, Ill., assignor to Republic Flow Meters Company, Chicago, Ill., a corporation of Illinois Application November 5, 1936, Serial No. 109,224

7 Claims. (Cl. 234—75)

This invention relates to recording instruments, and more particularly to the structure, and to the mounting in such instruments, of the charts used therein. These charts are usually disks of paper printed with suitable scales, time lines, and other indicia.

An object of the invention is to provide simplified and easily operated means for mounting the charts in the instrument. Another object is to provide for automatically positioning each chart in timed position when it is mounted in the instrument, without special attention from the operator.

The above and other objects and features of the invention, including various novel constructions and desirable particular arrangements, will be apparent from the following description of the illustrative embodiments shown in the accompanying drawing, in which:

Figure 1 is a partial top plan view of one novel instrument embodying the invention;

Figure 2 is a partial central section therethrough;

Figure 3 is a perspective of the chart post with parts broken away;

Figure 3a is a bottom view of the chart holding part;

Figure 4 is an end elevation of the clamping device and a cooperating chart-rotating member, when in the position it occupies when a chart is being replaced; and Figure 5 is a perspective view of a chart-supporting device carried by one end of the clock-driven shaft, and a timing projection carried thereby.

The instrument illustrated includes a suitable panel 10, to which is secured the housing 12 of an electrical or mechanical clock mechanism 14 having a driven shaft 16 which rotates a chart supported above the panel 10. As the chart is so driven, a record is made thereon by means such as a pen 18.

Figure 1 illustrates a chart for use on the instrument formed by a disk 20 of paper having printed thereon a series of concentric circles 22 spaced according to any desired scale (e. g. temperature, pressure, fluid flow, and the like). These circles 22 have their center at the center of rotation of the chart when it is in place in the instrument, and the pen 18 swings across them on an arc preferably intersecting the circles substantially at right angles. The chart usually also bears radially-extending printed arcuate lines 24 graduated in hours or other time intervals.

At the center of the chart there is an irregular or non-circular central opening 30 adapted to embrace the chart post of the instrument. Part of this opening has an edge, or edges, 32 on a circle about the center of rotation of the chart, and of the same diameter as the plain cylindrical chart post of a standard instrument, so that the chart can be used without difficulty on such an instrument, and can be filed with other charts on the usual cylindrical pegs of the same size as standard chart posts.

At one side of the opening there is a slot 34 projecting therefrom, and fitting over correspondingly shaped projections on the chart posts described below. At the other side, the opening forms a passage 36 opening into an offset portion 38 of the opening, which fits over correspondingly-shaped parts of the chart posts described below. The edge 40 of this portion of the opening is curved upon another circle, concentric with but larger than the first circle, to clear a timing projection forming part of the instrument of Figure 1, and which is hereinafter described.

An opening such as illustrated and described above will fit over the chart post of the instrument described below, as well as standard chart posts and filing pegs. I prefer to form the opening (and the chart posts) in the form of an identifying character, the one illustrated being the letter R.

In the illustrated instrument, the shaft 16 is hollow, to provide for a plunger 70, having at its lower end an abutment shown as a washer 72 held by a cotter pin, and urged downwardly by a spring 74 compressed between the washer 72 and a washer 76 engaging the bottom of the clock housing 12. The plunger 70 can be yieldingly latched in raised position by means such as a spring-pressed ball 78 adapted to seat in a groove 80 in the plunger.

The flange 42 on the upper end of the shaft 16 in this case carries a timing projection or pin 82, against which one edge of the portion 38 of the chart opening seats to time the chart. The upper end of the plunger 70 rigidly carries a clamping device or head 84, R-shaped in outline, which has on its lower face a cylindrical post portion 86 (the same in size as a standard old-style chart post) which rises and lowers in a socket 88 (Figures 2 and 5) in the flange 42. The head 84 may have a separately formed R 85, or other identifying character, formed of sheet metal and mounted thereon, and preferably spaced above its surface by the pins which fasten it in place, to provide convenient means easily grasped by the operator's fingers for raising the head 84 against the resistance of the spring 74.

This head 84 is formed with a non-circular opening 89 (Figure 3a) adapted slidably to fit over an irregular extension 91 (Figure 5) of shaft 16, so that the head is in effect non-rotatable but axially movable on the shaft. This head serves as a clamp to hold the chart yieldingly clamped against the flange 42, the chart being placed on the instrument by slipping the opening 30 over the head 84 when the latter is held raised by its latch 70, then turning the chart angularly about the post portion 86 to bring the edge of the opening 30 against the timing projection 82, and then pressing down on the head 84 to release the latch 70. A notch 87 in the bottom of the head 84, corresponding in size and shape to the timing projection 82 and in alinement therewith, permits the head to come down over the timing projection and clamp the chart.

While the chart may be turned manually to its timed position, I prefer to provide means for doing this automatically. The means illustrated includes an L-section member 90, journaled on the shaft 16 and shown as supported by the last gear of the clock mechanism 14, the upstanding flange 92 of which extends through the opening 88 of the chart across the bottom of the R of the head 84. A spring 94 anchored at its opposite ends to flange 42 and member 90 urges the member 90 angularly in a direction to hold the radial edge of the portion 88 of the chart opening 80 yieldingly against the timing projection 82. A spring-pressed ball latch 96 may be provided for yieldingly holding flange 92 and head 84 in alinement that is, with flange 92 in rotary register with the portion of head 84 on which the legs of the R lie while the chart is being fitted over them. The head 84 may, if desired, also have a pin 98 projecting into an L-shaped slot 100 in flange 92, to insure that head 84 cannot be lowered unless the chart is in its timed position.

From the above it will be seen that the head 84 is slidable on the shaft 16 but cannot rotate relative thereto due to the non-circular opening in the head fitting over the non-circular shaft extension and that the part 92 may turn about the axis of the shaft. The flange 42 carrying the timing projection 82 is rigid with the shaft.

To place a chart on the instrument an operator may raise the head 84 until the latch 70 engages and may turn the flange 92 counterclockwise until it is in register with the portion of the head 84 on which the legs of the R lie at which time the latch 96 will engage. The chart may then be placed on the instrument, the opening 30 passing over the head 84 and flange 92 with the edges 32 in engagement with the cylindrical portion 86 of the head and the edges of portion 88 engaging the ends of the flange 92.

By exerting a slight pressure on the flange 92 tending to rotate it, it will be moved clockwise to a position to disengage the latch 96 and will be turned to the position of Figures 1 and 3 by the spring 94. This action will bring the end of slot 100 into engagement with pin 98 and at the same time will rotate the chart clockwise to bring the edge of the portion 88 into engagement with the timing projection 82. The operator may then press down on the head 84, releasing latch 78 and allowing spring 74 to draw the head down against the chart. To remove a chart this procedure is reversed.

While several instruments, and one particular chart, have been described in detail, it is not my intention to limit the scope of the invention by that description, or otherwise than by the terms of the appended claims.

I claim:

1. A recording instrument comprising a clock-driven hollow shaft, a plunger extending through the shaft, a chart-holding device on one end of said plunger, and a spring acting on the other end of the plunger to operate said device to clamp a chart in place.

2. A recording instrument comprising chart-supporting means and a chart-positioning device at one side of the center of rotation of the instrument, and a spring-operated device pivotally movable about the center of rotation of the instrument and engageable with a chart for turning the chart to an angular position predetermined by said positioning device.

3. A recording instrument comprising chart-supporting means and a chart-positioning device at one side of the center of rotation of the instrument, a spring-operated device pivotally movable about the center of rotation of the instrument and engageable with a chart for turning the chart to an angular position predetermined by said positioning device, and a spring-operated clamping device for clamping the chart in place, said turning device and said clamping device having inter-engaging parts preventing the clamping device from engaging the chart except in its said predetermined angular position.

4. A recording instrument comprising a clock-driven shaft having non-rotatably but axially movable thereon at one end a spring operated clamping device for holding a chart, a chart positioning device at one side of said shaft, and a member pivotally movable about the center of rotation of the instrument and engageable with a chart for turning the chart relatively to said shaft to an angular position determined by said chart positioning device.

5. A recording instrument comprising a clock-driven shaft having non-rotatably but axially movable thereon at one end a spring operated clamping device for holding a chart, said device having one part formed with a surface which is a portion of a cylinder and with another part projecting laterally therefrom said one part being longer axially of the cylindrical surface than the other part to form at one end a cylindrical extension extending beyond said other part.

6. An instrument for use with a chart having a substantially central opening with one part having its edge on a circle with its center at the center of rotation of the chart and with another part offset outwardly beyond said circle, said instrument comprising a shaft, a device carried by said shaft of the same size and general outline as said central opening and over which device said opening fits, means carried by said shaft serving to predetermine the timing of the chart, and means for moving said device into engagement with the chart adjacent said opening, said central opening and the outline of said device being in the form of an identifying character.

7. An instrument for use with a chart having a substantially central opening with one part having its edge on a circle with its center at the center of rotation of the chart and with another part offset outwardly beyond said circle, said instrument comprising a shaft, a device mounted on said shaft of the same size and general outline as said central opening and over which said opening fits, said device being adapted to be raised so that the portion over which the offset part of the central opening fits will clear the chart when the chart is turned about said center of rotation with the first part of the central opening rotatably engaging the correspondingly-shaped portion of said device, to bring a part of the chart under said portion of the device, together with means for urging said first portion of the device against the chart to hold it.

JAMES D. CUNNINGHAM.